3,021,932
Patented Feb. 20, 1962

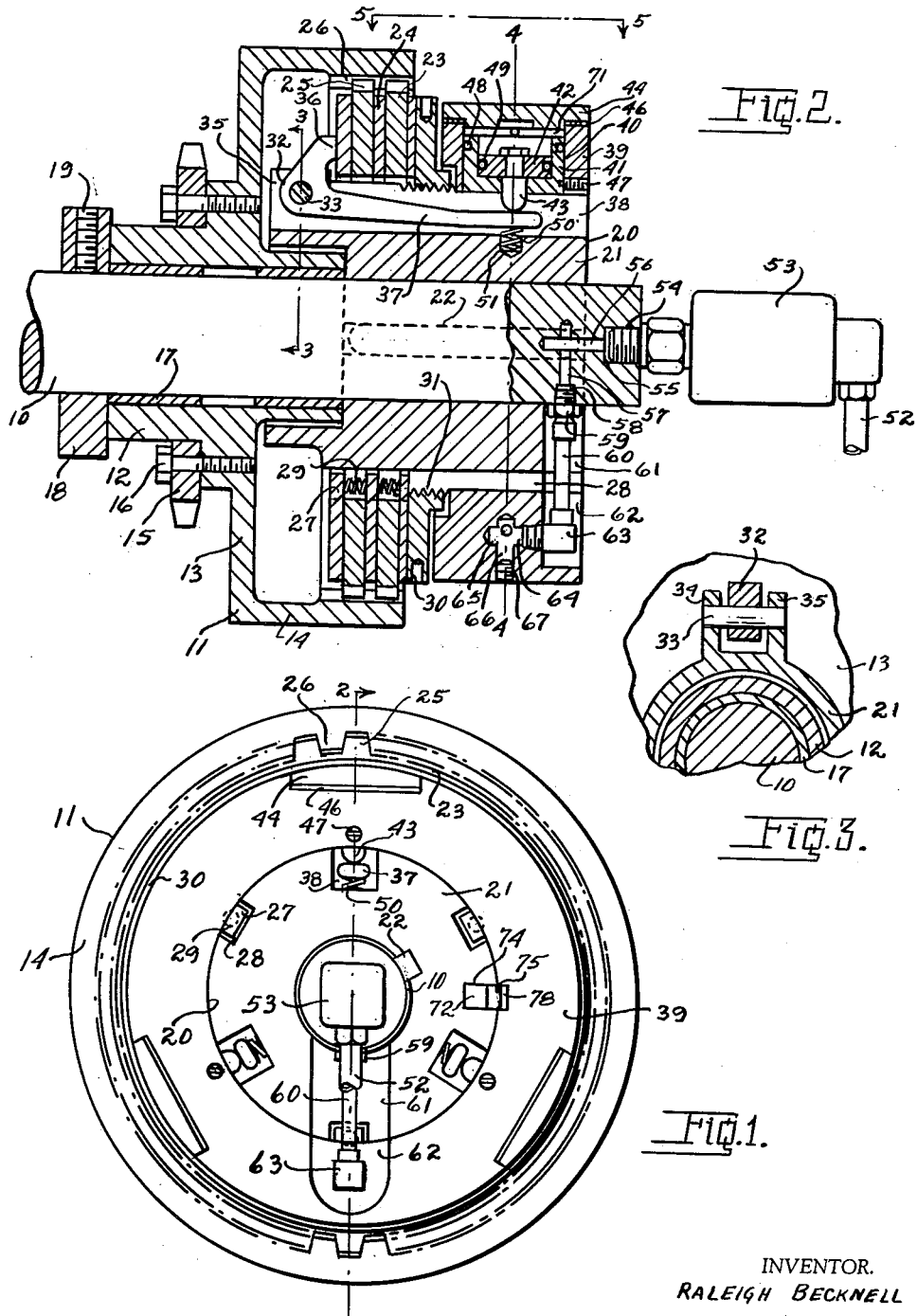

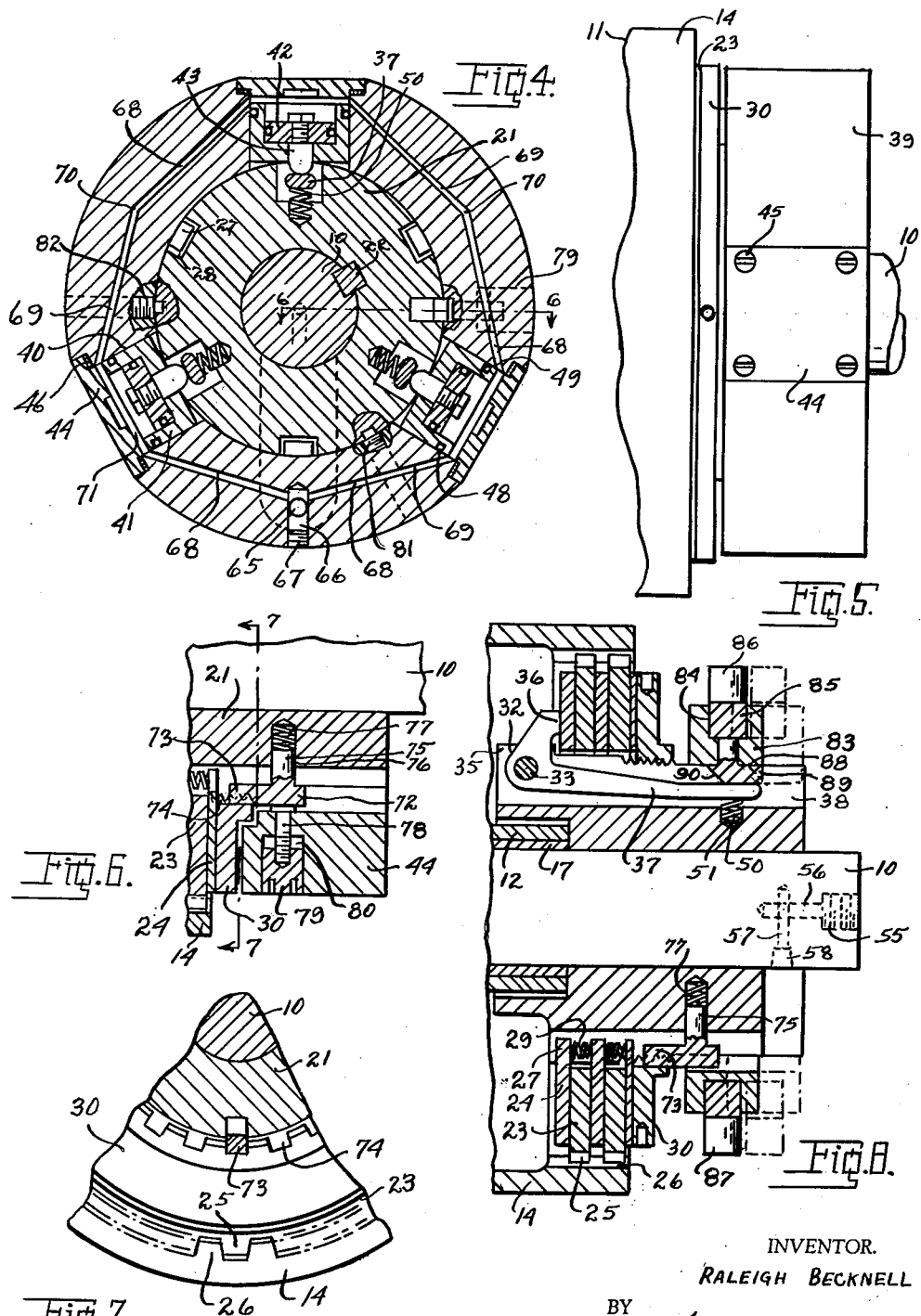

3,021,932
FRICTION CLUTCH
Raleigh Becknell, Cincinnati, Ohio, assignor to The Conway Clutch Company, Cincinnati, Ohio, a corporation of Ohio
Filed Sept. 19, 1958, Ser. No. 762,135
11 Claims. (Cl. 192—85)

This invention relates to improvements in a friction clutch, that is, a friction clutch of the type employing friction discs, and particularly to the means for actuating or operating said clutch discs into engagement and disengagement with one another.

Friction clutches, per se, of the kind herein disclosed are well known and in the past have been actuated or operated solely by manually operated mechanical means while that illustrated in the drawings is operated by a fluid pressure medium such as air.

The principal object of the present invention is, therefore, the provision of improved means for actuating or operating a friction clutch, such as a friction clutch of the friction disc type.

Another object of this invention is the provision of a friction disc clutch with which either a manually actuated operating member or a power operated, that is, fluid pressure medium, actuator may be selectively connected for operating the clutch.

A further object of the present invention is the provision of a hydraulic operated actuator for actuating the disc engaging members of a friction disc clutch.

A specific object of the present invention is the provision in the well known friction disc clutch of power actuated means for effecting the driving frictional engagement of the discs of such a clutch.

Other objects and advantages of the present invention should be readily apparent by reference to the following specification considered in conjunction with the accompanying drawings, forming a part thereof, and it is to be understood that any modifications may be made in the exact structural details there shown and described, within the scope of the appended claims, without departing from or exceeding the spirit of the invention.

In the drawings:

FIG. 1 is an end elevation of a friction clutch embodying the improvements of the present invention.

FIG. 2 is a vertical sectional view through the clutch of FIG. 1 as seen from line 2—2 on said FIG. 1.

FIG. 3 is a fragmentary sectional view through a portion of FIG. 2 as seen from line 3—3 on said FIG. 2.

FIG. 4 is a vertical sectional view through the clutch operating mechanism as seen from line 4—4 on FIG. 2.

FIG. 5 is a plan view of a portion of the clutch as seen from line 5—5 above FIG. 2.

FIG. 6 is a fragmentary sectional view through a portion of the clutch as seen from line 6—6 on FIG. 4.

FIG. 7 is a transverse sectional view through the parts illustrated in FIG. 6 as seen from line 7—7 on said FIG. 6.

FIG. 8 is a fragmentary sectional view of a portion of FIG. 2 showing the manual clutch actuating mechanism as distinguished from and substituted for the power operated mechanism illustrated, for example, in FIG. 2.

Throughout the several views of the drawings similar reference characters are employed to denote the same or similar parts.

As disclosed in the drawings the friction clutch of the present invention is illustrated as mounted on a shaft 10 on which is loosely mounted the driving clutch member 11 which comprises a hub portion 12 having integral therewith a flange or body portion 13 with a peripheral flange 14 forming, in effect, a cup member. Secured to the clutch member hub 12 is the means for driving the said clutch member which is illustrated in the drawings as a sprocket 15 secured in operative position by cap bolts 16. It should be noted that the driving member instead of being a sprocket 15 may be a gear, pulley or the like and which is suitably connected with a motive power, not shown. The clutch member 11 is mounted on bushings 17 for free and independent rotation on the shaft 10 and with said clutch member 11 retained against axial movement on said shaft by a collar 18 secured to the shaft by a set screw 19.

Disposed and secured on the shaft 10 for movement therewith is the driven clutch member 20 including a carrier or sleeve 21 suitably keyed at 22 to the shaft 10. The carrier 20 has mounted thereon one or more driving friction discs 23 alternating with driven friction discs 24. The driving friction discs 23 are illustrated in the drawings, particularly in FIG. 1, as having lugs 25 in the form of gear teeth projecting outwardly of its periphery and with said gear teeth 25 disposed between adjacent gear teeth 26 inwardly projecting from the driving clutch member cup flange 14. It is to be understood that the said connection of these parts need not be in the form of complete gear teeth but may be in form of independent lugs spaced at intervals around the periphery of the driving clutch disc 23, as is customary in the art; the larger sizes of clutches employing gear teeth entirely around the disc periphery and driving clutch member, while the smaller sizes of clutches employ the spaced driving lugs, all, as noted above, well known in friction disc clutch art.

The driven clutch discs 24 are provided at spaced intervals on the periphery of their bores with inwardly projecting lugs 27 which project into suitable passageways or keyways 28 in the clutch sleeve or carrier 21. As illustrated in FIG. 1 each of said driven clutch discs 24 is provided with three lugs 27, each projecting into a passageway or keyway 28. In practice the said lugs 27 of the said driven friction discs are used as abutments for separating springs 29, whereby, upon release of the clutch discs, the said driving and driven friction discs are separated from one another.

The friction discs 22 and 23 are pressed into driving engagement with one another and into driving engagement against a thrust member, illustrated in the drawings as a flange nut 30, having a diameter and area substantially equal to the diameter and contact area of the said driving and driven clutch discs. The nut 30 is suitably threaded on an enlarged portion 31 of the driven disc sleeve or carrier 21 and is locked in position, as will later be made clear.

The driving and driven friction discs are pressed into operative engagement with one another through a plurality of pivotally mounted lever-actuators 32, in the form of bell cranks, there being three such levers, as illustrated in FIG. 1, equally spaced from one another around the clutch sleeve or carrier 21. Each lever-actuator 32 is pivotly mounted on a pivot pin 33 extending between a pair of ears 34 and 35, see FIG. 3, upstanding from the inner end of the clutch sleeve or carrier 21. Each lever-actuator 32 is provided with a clamping head 36, as one arm of the bell crank, and an actuating tail or arm 37, as the second arm of the bell crank, and each lever-actuator 32 is disposed in a passageway 38 in the form of a keyway let into the clutch sleeve or carrier 21.

The driving and driven friction discs 23 and 24 are pressed into operative engagement with one another by operating the lever-actuators 32 in a clock-wise direction, as seen in FIG. 2, about their pivots 33 and thereby through their clamping heads 36 pressing said friction discs into driving engagement against one another and against the thrust nut 30.

In order that the said lever-actuators 32 may be so operated there has been provided a new and novel mechanism for power operation thereof and which mechanism, as particularly illustrated in FIGS. 2 and 4, comprises a housing 39, which may be designated as a cylinder housing, which is provided with a radial bore 40 for each lever-actuator 32, as illustrated in FIG. 4. Disposed in each bore 40 is a cylinder 41, secured in position by a set screw 47, with each having mounted for movement therein a piston 42. Each cylinder 41 is closed at its inner end and each piston 42 has secured thereto substantially centrally thereof a short piston rod or pin 43 to project downwardly throulgh an aperture in its cylinder closed end and which piston rod or pin 43 overlies a lever-actuator 32. Each cylinder bore 40 in the cylinder housing 39 is closed at its outer end by a cap plate 44 secured to the housing 39 by means of cap screws 45, see FIG. 5. A suitable gasket 46 is provided between each cap plate 44 and the housing to insure the cylinder bore against leakage.

Each cylinder 41, as noted above, is secured in position within its bore by a screw 47 and to insure against leakage around the cylinders 41 when within their respective bores 40 each cylinder 41 is provided with an external peripheral groove receiving a gasket 48 which may conveniently take the form of the well-known O-ring. Similarly to insure against leakage around each piston 42 within its cylinder 41 each piston is provided with an external circumferential groove receiving a gasket 49 which, again, may take the form of an O-ring.

Each friction disc lever-actuator 32 is retained against its piston rod or pin 43 by means of a spring 50 disposed in a socket 51 let into the clutch sleeve or carrier 21 through the base of the said lever-actuator passageway or keyway 38. The springs 50 are each of such force as to effect the release of the friction discs 23 and 24 by actuating the said levers in a counterclockwise direction as seen in FIG. 2 unless under pressure of the pistons 42.

As noted above the pistons 42 are actuated by a fluid pressure medium, such as compressed air, delivered to the clutch mechanism by way of a pipe or conduit 52 extending from a compressed air tank or pump, not shown in the drawings. The pipe or conduit 52 terminates in a rotating air union 53, the construction and operation of which is well known and is deemed need not be illustrated in the drawings since it is a commercial product obtainable on the market. The rotating air union terminates in a threaded projection or nipple 54 threaded into a socket 55 in the end of the shaft 10. The shaft 10 has extending from the socket 55 a duct or port 56, axially thereof, and which duct or port has extending therefrom a radial duct or port 57 terminating in a socket 58 into which the connector 59 of a short pipe or conduit 60 is threaded. The pipe or conduit 60, in the clutch as illustrated in the drawings, is disposed in aligned passageways 61 and 62 formed, respectively, in the outer end and outer surfaces of the clutch carrier or sleeve 21 and the cylinder housing 39. The said conduit 60 has at its outer end a second fitting 63 received in a socket 64 formed in the cylinder housing 39 and from which projects a duct or port 65 having its axis extending parallel with the axis of the cylinder housing 39 and the axis of the shaft 10. The duct or port 65 communicates with a duct or port 66 formed radially of the cylinder housing 39 at a point intermediate the side faces thereof and said radial duct or port 66 has its outer end closed by a suitable plug 67.

Each of the cylinder bores 40, and therefore the cylinders 41, is connected in a series circuit with the other and with said radial port or duct 66, as clearly illustrated in FIG. 4. This connection of the cylinder bores with one another comprises the formation within the cylinder housing, and between the side faces thereof, from diametrical points at the upper ends of each cylinder bore 40 of transverse angular ducts or ports 68 and 69. Said ducts or ports 68 and 69 of the cylinder bore located on opposite sides of the radial duct or port 66 terminate in said duct or port 66, while the said angular transverse ducts or ports from said cylinder bores, one on each side of said radial duct or port 66, and the cylinder bore intermediate them intercept one another as at 70.

It will be noted from FIG. 4, the pressure in the radial duct or port 66 is communicated by the transverse angular ducts or ports 68 and 69 to each of the cylinder bores and therefore the cylinders and pistons therein.

It will further be noted that the said cylinders 41 are each formed of a length so that when secured in operative position by its securing screw 47 there is provided between the upper end of each cylinder and the under surface of its closure cap a space 71 so that the air pressure can never be completely excluded from the piston within its cylinder.

The operation of the clutch is believed obvious from the foregoing but briefly is as follows:

The fluid pressure medium, compressed air, by way of the pipe or conduit 52 is passed through the leak-proof rotating air union to the socket 55 and from there by way of ports or ducts 56 and 57 and connector 60 to the socket 64. The said fluid pressure medium passes from the socket 64 through ports or ducts 65, 66, 68 and 69 to the several cylinder bores 40 and cylinders 41 for actuating the pistons 42. The actuation of the pistons 42 actuates the lever-actuators 32 in a clockwise direction against the yielding resistance of the springs 50 and said levers 32 through their clamping ends or heads 36 clamp or press the friction discs 23 and 24 and the abutment 30 into driving engagement and thereby transmit motion or power from the driving clutch member 11 to the driven clutch member 20 and the shaft 10.

Reversely, the release of pressure in the pipe or conduit 52, or the reduction of pressure in said pipe or conduit 52 to zero, permits the springs 50 to operate the lever-actuators 32 in a counter-clockwise direction, or clutch disc releasing direction, for thereby permitting the springs 29 to separate the clutch discs 23 and 24 from one another sufficiently that no driving engagement exists therebeneath.

The thrust nut 30 is adjustable so that the proper driving connection is established between the discs 23 and 24 upon the operation of the parts and the said thrust nut is locked in its adjusted position. As is customary this locking of the thrust nut is effected by way of a key 72 having a nose portion 73 which projects into suitable receiving slots 74 in the said nut 30, see FIGS. 6 and 7. The said nut 30 must likewise be adjusted in the event of wear, or after wear has taken place between the discs, and to effect the said nut adjustment the locking key must be displaced. To effect and permit this displacement of the locking key 72 it has projecting therefrom a guide 75 slidably disposed in a socket 76 against a coil spring 77. In order to effect the said displacement of the key 72 it has abutting therewith one end of a plunger which conveniently takes the form, in part of a screw 78 threaded into and projecting from a plug 79 slidably mounted in a socket 80 radially of the cylinder housing 39, all as seen clearly in FIG. 6.

The operation of the nut locking mechanism is believed obvious from FIGS. 6 and 7 since pressure on the outer end of the plug 79 will through the composite plunger, including screw 78, inwardly depress the key 72 to free it of the nut 74 so that the said nut may be adjusted and a new locking slot brought into alignment with the key 72 and upon release of pressure on the plug 79 the spring 77 will relock the nut in its adjusted position.

It should be noted that while the several piston and plunger mechanisms herein above set forth will retain the cylinder housing and parts carried thereby in operative relation to the friction discs operating lever-actuator 32, the said cylinder housing is secured in operative position by means of securing screws 81 and 82, see FIG. 4, and judiciously located with respect to the several cylinder bores and the transverse connecting ports.

Clutches of the kind herein disclosed are frequently used in the field wherein compressed air or other fluid pressure medium is available through auxiliary mechanism and which mechanism has the tendency of becoming inoperative thereby rendering the clutch inoperative due to no power for actuating the pistons 42. In order that the clutch may be operated under these circumstances there has been provided manually operable means to replace the power actuated means.

The said manually operable means consists in providing manually shiftable ring 83 having a bore therein of a diameter similar to the diameter of the bore through the cylinder housing 39, and after releasing the cylinder housing securing screws 81 and 82 and removing said cylinder from the clutch member sleeve or carrier 21, mounting said ring 83 on the said clutch member sleeve or carrier. In order to shift said ring 83 it has formed in its periphery a groove 84 for the reception of the usual split shifting collar 85 that has, in turn, projecting from diametrically opposite points, trunnions 86 and 87 connectable with the usual manually actuated shifting lever, not shown in the drawings.

The ring 83 has inwardly projecting from the periphery of its bore 88 a plurality of shoes 89, there being a separate shoe 89 for each friction disc lever-actuator 32, and with each shoe 89 having an angular cam face 90 at its inner end. The ring 83 is shiftable from the solid line position to the phantom line position in FIG. 8, the solid line position illustrating the clutch in its driving condition while the phantom line position illustrates the clutch in its released position.

It is believed obvious that upon shifting of the ring 83 from its phantom line position to its solid line position the shoes 89 through their cam faces 90 operates the lever-actuators 32 against the resistance of springs 50 while reverse actuation of said ring 83 permits the said springs 50 to release the lever-actuator 32 as soon as the shoes 89 are outwardly of the levers.

From the foregoing it is believed obvious that there has been provided a friction disc clutch that accomplishes the objections initially set forth.

What is claimed is:

1. In a friction disc clutch the combination of a driving clutch member, a driven clutch member, a friction disc operatively connected with each clutch member with said discs adapted to be pressed into driving engagement with one another, an abutment carried by one of said clutch members against which the friction discs are pressed, a lever-actuator pivotally mounted on one of said clutch members with said lever-actuator including on one side of its pivot means for pressing said clutch discs into driving engagement, said lever-actuator being adapted to be oscillated about its pivot for pressing said friction discs into driving engagement, said lever-actuator also including on the other side of its pivot means through which the said lever-actuator is oscillated, and a fluid pressure medium actuated piston engaging the lever-actuator operating means for oscillating said lever-actuator and pressing the friction discs into driving engagement.

2. In a friction disc clutch the combination of a driving clutch member, a driven clutch member, a friction disc operatively connected with each clutch member with said discs adapted to be pressed into driving engagement with one another, an abutment carried by one of said clutch members against which the friction discs are pressed, a lever-actuator pivotly mounted on one of said clutch members with said lever-actuator including on one side of its pivot means for pressing said clutch discs into driving engagement, said lever-actuator being adapted to be oscillated about its pivot for pressing said friction discs into driving engagement, said lever-actuator also including on the other side of its pivot means through which the said lever-actuator is oscillated, a fluid pressure medium actuated piston engaging the lever actuator oscillating means for oscillating said lever-actuator and pressing the friction discs into driving engagement, and yieldable means for reversely operating said lever-actuator.

3. In a friction disc clutch the combination of a driving clutch member, a driven clutch member, a friction disc operatively connected with each clutch member with said discs adapted to be pressed into driving engagement with one another, an abutment carried by one of said clutch members against which the friction discs are pressed, a lever-actuator pivotly mounted on one of said clutch members with said lever-actuator including on one side of its pivot means for pressing said clutch discs into driving engagement, said lever-actuator being adapted to be oscillated about its pivot for pressing said friction discs into driving engagement, said lever-actuator also including on the other side of its pivot means through which the said lever-actuator is oscillated, a fluid pressure medium actuated piston engaging the lever-actuator oscillating means for oscillating said lever-actuator and pressing the friction discs into driving engagement, yieldable means for reversely operating said lever-actuator, and yieldable means for releasing the friction discs from driving engagement.

4. In a friction disc clutch the combination with a driving clutch member, a driven clutch member, a friction disc operatively connected with each clutch member, said discs being adapted to be pressed into driving engagement with one another, an abutment on said driving clutch member against which the friction discs are pressed, and a plurality of pivotly mounted lever-actuators carried by the driven clutch member for pressing the clutch discs into driving engagement with one another and the abutment, of a cylinder housing mounted on said driven clutch member including a fluid medium pressure actuated piston for each lever-actuator and operating the same, and means supplying a fluid pressure medium to each piston for simultaneously actuating the same and their friction disc lever-actuators.

5. In a friction disc clutch the combination with a driving clutch member, a driven clutch member, a friction disc operatively connected with each clutch member, said discs being adapted to be pressed into driving engagement with one another, an abutment on said driven clutch member against which the friction discs are pressed, and a plurality of pivotly mounted lever-actuators carried by the driven clutch member for pressing the clutch discs into driving engagement with one another and the abutment, of a cylinder housing mounted on said driven clutch member including a fluid medium pressure actuated piston for each lever-actuator and operating the same, means supplying a fluid pressure medium to each piston for simultaneously actuating the same and their friction disc lever-actuators, said pistons being adapted to have the fluid pressure medium withdrawn therefrom, and yieldable means reversely operating the lever-actuators to release the friction discs from driving engagement.

6. In a friction disc clutch the combination with a driving clutch member, a driven clutch member, a friction disc operatively connected with each clutch member, said discs being adapted to be pressed into driving engagement with one another, an abutment on said driven clutch member against which the friction discs are pressed, and a plurality of pivotly mounted lever-actuators carried by the driven clutch member for pressing the clutch discs into driving engagement with one another and the abutment, of a cylinder housing mounted on said driven clutch member including a fluid medium pressure actuated piston for each lever-actuator and operating the same, means supplying a fluid pressure medium to each piston for simultaneously actuating the same and their friction disc lever-actuators, said pistons being adapted to have the fluid pressure medium withdrawn therefrom, yieldable means reversely operating the lever-actuators to release the friction discs from driving engagement, and yieldable means actuating the friction discs from one another upon yieldable operation of the lever-actuators.

7. In a friction disc clutch the combination with a shaft, a driving clutch member freely rotatable on said shaft, a driven clutch member secured to said shaft, a friction disc operatively connected with each clutch member, said discs being adapted to be pressed into driving engagement with one another, an abutment on said driven clutch member against which the friction discs are pressed, and a plurality of pivotly mounted lever-actuators carried by the driven clutch member for pressing the clutch discs into driving engagement with one another and the abutment, of a cylinder housing mounted on said driven clutch member including a fluid medium pressure actuated piston for each lever-actuator and operating the same, and means supplying a fluid pressure medium to each piston for simultaneously actuating the same and their friction disc lever-actuators, including a rotatable pressure medium union carried by the shaft having one side connected with a fluid pressure medium source and the other side connected with a duct axially of the shaft, and means connecting the shaft duct with the cylinder housing pistons.

8. In a friction disc clutch the combination with a driving clutch member, a driven clutch member, a friction disc operatively connected with each clutch member, said friction discs being adapted to be pressed into driving engagement with one another, an abutment against which said friction discs are pressed, said driven clutch member including a sleeve portion and pivotly mounted means for pressing said clutch discs into driving engagement with one another and the abutment, of interchangable power and manually actuated means on said driven clutch member sleeve, said power actuated means including means for securing it to the sleeve, said manually actuated means including means whereby it may be slid along the sleeve, and each said power actuating means and manually actuating means including means for operating the friction discs pressing means.

9. In a clutch operating mechanism the combination with a plurality of friction clutch discs, of a plurality of pivotly mounted lever-actuators each including means for pressing the clutch discs into driving engagement with one another, each lever-actuator including an arm through which it is operated about its pivot, a cylinder housing member encircling the operating arms of said lever-actuators, said housing including a cylinder radially of each operating arm, a piston in each cylinder including means for engaging a lever-actuator operating arm, a fluid pressure medium for actuating the pistons, and means for simultaneously connecting the fluid pressure medium with the cylinders and simultaneously operating the lever-actuators.

10. In a clutch operating mechanism the combination with a plurality of friction clutch discs, of a plurality of pivotly mounted lever-actuators each including means for pressing the clutch discs into driving engagement with one another, each lever-actuator including an arm through which it is operated about its pivot, a cylinder housing member encircling the operating arms of said lever-actuators, said housing including a cylinder radially of each operating arm, a piston in each cylinder including means for engaging a lever-actuator operating arm, a fluid pressure medium for actuating the pistons, and means for simultaneously connecting the fluid pressure medium with the cylinders and simultaneously operating the lever-actuators, including a pressure medium supply port in said cylinder housing, means connecting the cylinders with said supply port, and means for connecting the supply port with a pressure medium source.

11. In a clutch operating mechanism the combination with a plurality of friction discs, of a plurality of pivotly mounted lever-actuators including means for pressing the clutch discs into driving engagement with one another, each lever-actuator including an arm through which it is operated about its pivot, a cylinder housing member encircling the operating arms of said lever-actuators, said housing including a cylinder radially of each operating arm, a piston in each cylinder including means for engaging a lever-actuator operating arm, a fluid pressure medium for actuating the pistons, and means for simultaneously connecting the fluid pressure medium with the cylinders and simultaneously operating the lever-actuators including a pressure medium supply port in said cylinder housing, means connecting the cylinders with said supply port, a pressure medium source, and a rotating pressure medium union having one end connected with said fluid pressure medium source and the other end with the cylinder housing supply port.

References Cited in the file of this patent

UNITED STATES PATENTS

| | | |
|---|---|---|
| 1,924,108 | Conway | Aug. 29, 1933 |
| 2,649,175 | Stripling | Aug. 18, 1953 |
| 2,775,330 | Schjolin et al. | Dec. 25, 1956 |
| 2,857,031 | Fawick | Oct. 21, 1958 |
| 2,880,835 | Hass | Apr. 7, 1959 |